United States Patent [19]

Olmstead

[11] 4,068,302
[45] Jan. 10, 1978

[54] COMPUTER PERFORMANCE MEASUREMENT

[75] Inventor: Edward Allen Olmstead, Federal Way, Wash.

[73] Assignee: Black Bocs, Ltd., Des Moines, Wash.

[21] Appl. No.: 662,013

[22] Filed: Feb. 27, 1976

[51] Int. Cl.² .................................................. G06F 11/00
[52] U.S. Cl. ................................................... 364/200
[58] Field of Search ..................... 340/172.5; 73/67, 70, 73/71.2, 71.4

[56] References Cited

U.S. PATENT DOCUMENTS

| | | | |
|---|---|---|---|
| 3,426,331 | 2/1969 | Joyce | 340/172.5 |
| 3,771,131 | 11/1973 | Ling | 340/172.5 |
| 3,771,144 | 11/1973 | Belady et al. | 340/172.5 |
| 3,818,458 | 6/1974 | Deese | 340/172.5 |
| 3,971,249 | 7/1976 | Bachofer | 73/67 |

Primary Examiner—Raulfe B. Zache
Attorney, Agent, or Firm—John M. Crawford

[57] ABSTRACT

The performance of a computer may be evaluated by measuring the movement of the read-write head of the disc information storage of a computer, and the speed of revolution of the disc. A signal is relayed to an external recorder to disclose movement of the head and the disc speed. A number of other performance criteria may be determined from these. There is no electrical connection between the sensing system and the internal electrical system of the computer or storage system.

24 Claims, 3 Drawing Figures

COMPUTER PERFORMANCE MEASUREMENT

BACKGROUND OF THE INVENTION

1. Field of the Invention

Measuring the activity in the information storage units of a computer.

2. Description of the Prior Art

The performance of a computer is important because of its high fixed cost, its high operational cost, and its potential for processing information at high speed. Poor performance, in terms of utilization, will not only result in higher operational costs through less work per unit time but also in higher fixed costs through additional equipment needed to handle the work.

Since the theoretical maximum processing capacity of the computer is difficult to determine because of the number of factors affecting it, an assumed maximum capacity is used as an indicator to determine performance. However, determining performance is not easy.

One method is to determine the amount of time, and therefore the percentage of time, that various electrical circuits within the computer are operating. This is done by two principal methods.

The first is to connect wires to specific probe points within these circuits. The wires are connected to external recording devices which will then show when current, and therefore information, is passing through the circuit.

For example, an electrical circuit that would be monitored is the circuit between information storage and either the computer processing section or an external source. The greater percentage of time that information is passing through this circuit, as indicated by the current within the circuit, the better the performance of the computer.

In most large computers the information, both processable information and processing or program information, is stored on discs in an array of cylinders. The cylinders are best represented by concentric rings on the surfaces of the discs. There may be as many as five hundred cylinders of information on a disc and five thousand or more bits of information on each cylinder. Usually, a number of discs, from two to twenty, are mounted together as a unit and rotate on a single axis. There may be as many as one thousand of these units in a computing facility. Three to four hundred are common.

For each side of a disc there is a corresponding read-write head. The head reads or carries information stored on a cylinder to the computer information processing section or to an external source, and writes or carries information either from an external source or the computer information processing section to a cylinder for storage.

Each head is mounted on an arm. The arms for a unit of discs are integral and form a comb. The comb moves all the heads radially back and forth together among the cylinders on the discs. Only information to or from a single cylinder on a unit of discs may be transferred or accessed at any one time.

One method of determining the performance of the disc storage, and the computer, is to attach wires to the electrical circuits of the heads and determine the amount of time that current is passing through the heads. There are a number of problems that can occur when wires are attached to these circuits, or to any electrical circuit within the computer. The major problem is that the information passing through the circuit may be changed when external wires are attached. Extraneous current from the wire may pass into the circuit and be interpreted as information by the computer information processing section or the storage system. If there is no information passing through the circuit, the extraneous current may supply information when there shou;d be none. If there is current, and information, passing through the circuit, the extraneous current may add or subtract from that current and change the information passing through the circuit. These changes will result in reduced performance because the information must be reprocessed. Often the computer will stop because the information or program is unprocessable.

It is also difficult to place the wires properly. Several man days are required because of the number of wires. The probe points must be found and tests made to determine whether they are located correctly.

The possibilities for error are great when testing for performance this way.

A second method is to make a continuing record of the transactions occurring in the system. A software program is introduced into the system. This program requires that any transactions be recorded on a separate tape or disc file. The location of the transaction will also be recorded. The file is later analyzed to determine the performance of the computer. A practical problem is that the analysis occurs long after the transactions that were monitored, and the conditions within the computer and information storage at the time of analysis may not be the same as at the time of monitoring. It is an attempt to improve the performance of a filing system after many of the old files, on which the performance evaluation has been based, have been replaced with new files.

SUMMARY OF THE INVENTION

The inventor, a consultant in computer system performance measurement, was relaxing after giving a seminar on the subject. During his presentation he had described the many problems that can happen when attempting to obtain appropriate data by wiring recording devices to the internal electrical circuits of a computer. He was again wondering if there was not a simpler method of obtaining this data, one that would be less dangerous to the computer system.

It must be a system that did not connect to the internal electrical system of the computer. It must use some other indicator to show computer performance. He suddenly realized that the movement of the combs for the read-write heads of the disc storage system caused the frame and cabinet housing for the system to vibrate. He also knew that no information was being transmitted by that particular storage system while the comb and heads were moving between cylinders. He then realized that the vibration of the frame or cabinet of the disc storage system caused by the comb and head movement would indicate that no information was being transmitted to or from information storage, and that this vibration could be measured and recorded without connecting wires to the internal electrical circuit of the computer.

He realized that a method of measuring and recording the vibration of the disc storage cabinet or frame using a vibration sensing device and an external recorder attached to it would give an indication of the performance of the computer. From this he was able to determine that other indicia of head movement could also be used.

DESCRIPTION OF THE PREFERRED EMBODIMENTS

Figure 1:
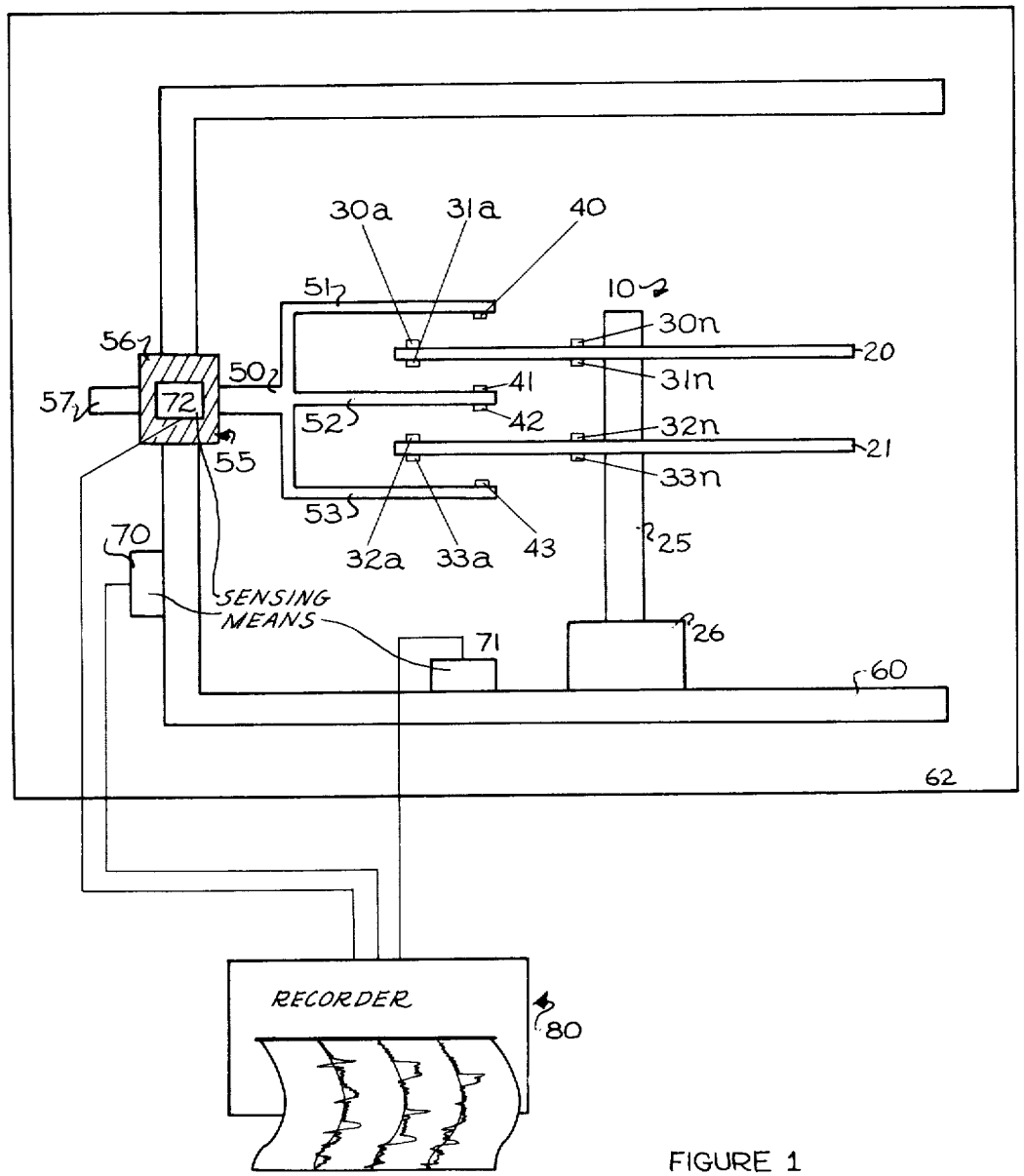
FIG. 1 shows a disc storage device with a block diagram of a vibration sensing apparatus and a recording apparatus.

FIG. 1 is a schematic diagram of a disc information storage system. For simplicity a unit 10 of two discs is shown. Discs 20 and 21 rotate on an axis 25 driven by a motor 26.

Each disc has cylinders on both its upper and lower face. Cylinders 30a-30n and 31a-31n are on the upper and lower faces, respectively, of disc 20, and cylinders 32a-32n and 33a-33n are on the upper and lower faces, respectively, of disc 21. As stated before, each face may have as many as five hundred cylinders.

There is also a read-write head for each face of the disc. The head accesses the cylinders to transfer information to or from them. The head 40 is opposite the upper face of disc 20; the head 41 is opposite the lower face of disc 20; and head 42 is opposite the upper face of disc 21; and the head 43 is opposite the lower face of disc 21.

The heads are moved as a unit among the cylinders by integral arms or comb 50 — head 40 on arm 51, heads 41 and 42 on arm 52, and head 43 on arm 53. Comb 50 is moved by means 55. The usual means 55 is a coil 56 which moves an armature 57 attached to comb 50.

The entire mechanism is mounted on a frame 60 within a housing 62. Typically, the motor 26 and coil 56 would be fixedly mounted on the frame 60, the axis 25 would be rotatably mounted on the frame, and the armature 57 and comb 50 slidably mounted on the frame 60. Both the frame 60, or mounting means, and the housing 62 will vibrate as the comb 50 and heads 40-43 move. The type of vibration will depend upon the specific method of starting and braking the comb, and the material used for the frame and housing. Usually both the beginning of the comb movement and the braking of the comb movement will produce a definite indicating vibration.

This vibration will be sensed by sensing means 70 placed on the frame or housing. Means 70 may be an accelerometer, a microphone or a vibration sensor. An additional means 71 may also be placed on the frame or housing to sense the vibration caused by the rotation of the discs. It would be similar to means 70. Each of these means would be damped to sense the vibration specific to the unit being measured.

Another device that can determine head movement would be means 72 to detect both the flow of current in coil 56 and the direction of flow. The current would flow through coil 56 during head movement and the direction of current flow would depend on the direction of head acceleration. It would flow in one direction at the start of head travel and in the opposite direction during braking of head travel. The means 72 could be a current sensing device, such as a current transformer or a Hall Device, adjacent to coil 56 which will have generated within it a slight amount of current in response to the current in coil 56. The direction of current in means 72 will depend upon the direction of current in the coil 56.

The various means 70, 71 and 72 would be connected to a recorder 80 — a graphic plotter, a counter, a light or a computer. The recorder would be placed to provide a ready display to those operating the computer facility and allow them to use the displayed data to make apprpriate adjustments within the facility for improved performance.

This central display is significant when dealing with the usual multiple storage unit system of from two hundred to one thousand units. The display allows the operator to move information among the units for more efficient information flow. It allows the constantly used programs to be placed on the more rapidly rotating units for faster transfer of this information, and the least used information to be placed on the slower rotating units. There may be a ten percent variation in the rotational speed of the units, and the appropriate placement of information on a higher speed device allows better access to it.

The head movement display also shows whether particular units are overloaded. If there is much head movement in a few units and little head movement in the rest, it can be assumed that a few units are overloaded. A shifting of information among the units may then allow a smoother and more continuous flow of information.

Figure 2:
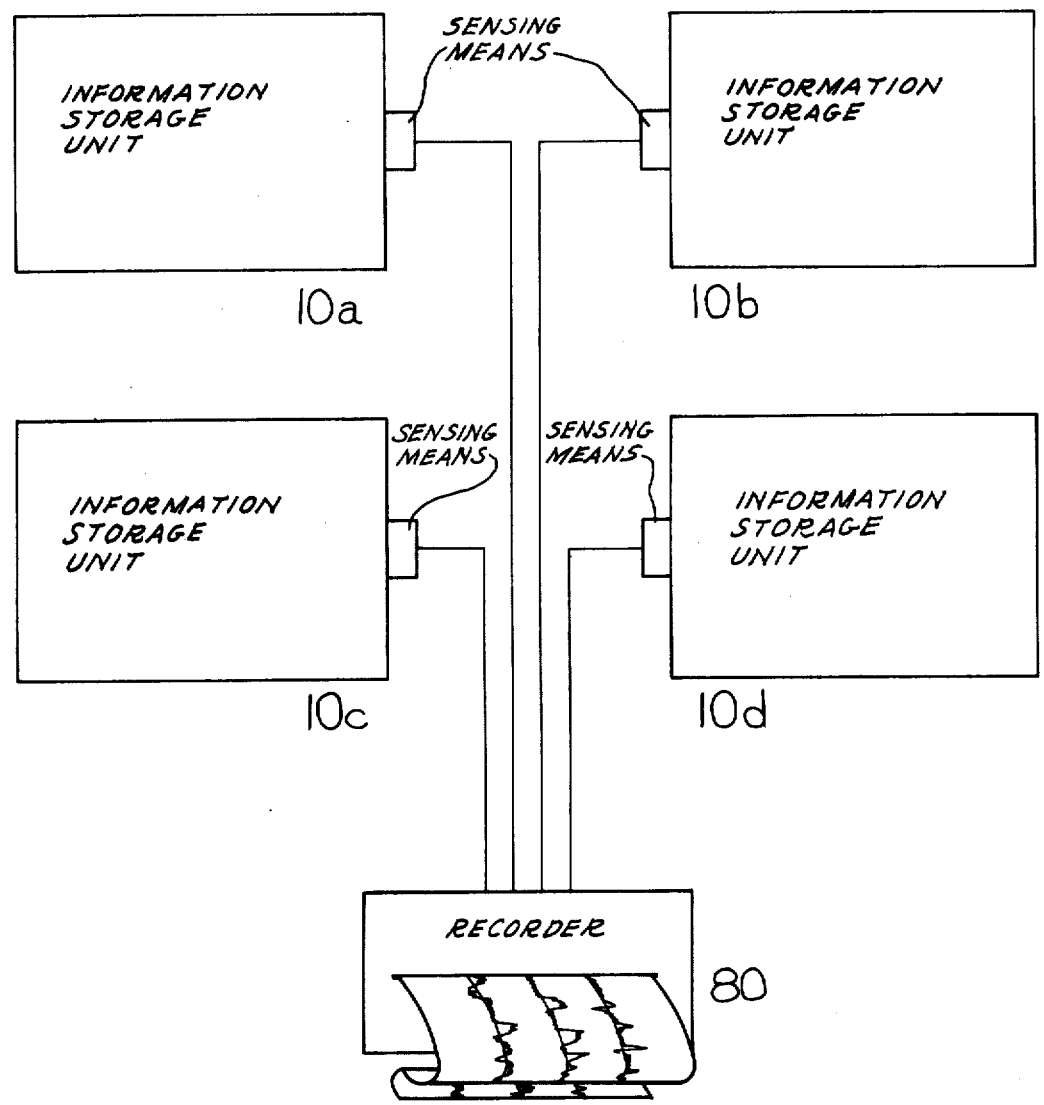
FIG. 2 is a diagramatic view of a typical multiple storage installation using the sensing and recording apparatus.

FIG. 2 shows a multiple unit installation in which a number of units 10a, 10b, 10c and 10d each has a sensor attachd. The sensors are connected to the central recorder 80.

Figure 3:
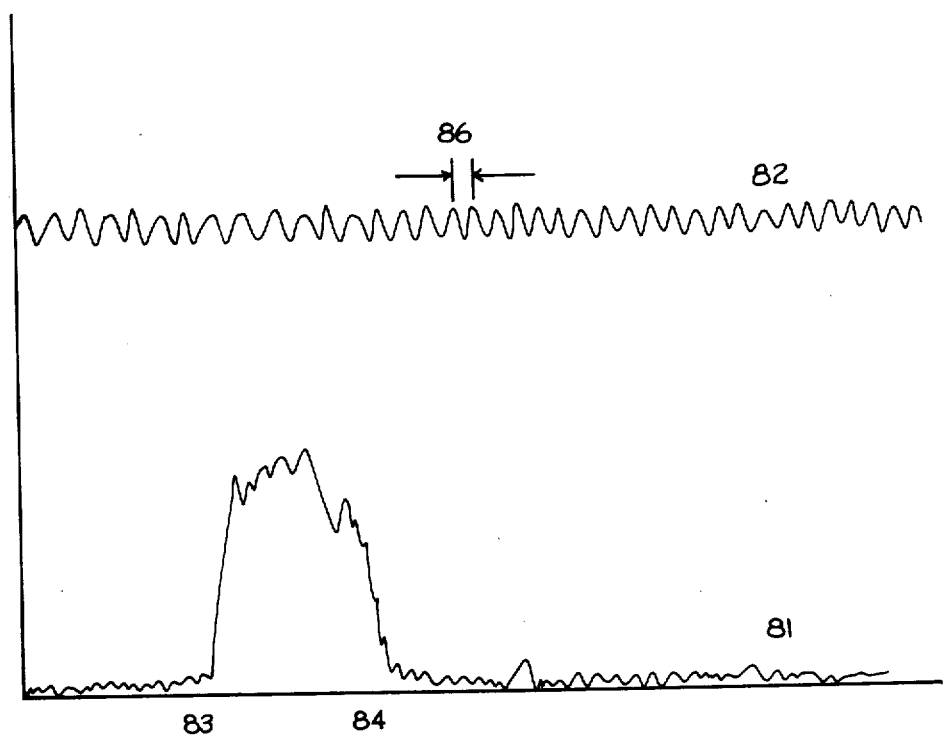
FIG. 3 is a typical graph of vibration caused by arm movement.

One type of output from a recorder 80 is shown in FIG. 3. A two track graph shows both the vibration caused by head movement in track 81 and the vibration caused by disc revolution in track 82. The start of head movement is shown at 83 and the stop of head movement at 84. Each rotation of the disc is noted at 86.

The start and stop of head movement discloses whether information is being stored on adjacent cylinders or far apart. Constant long traversals of the head would indicate that the information should be relocated to allow more time for information transfer and less for head movement.

Usually, information transfer begins at a specific time during disc rotation. A comparison of head travel and disc rotation will determine whether there is a high incidence of lost opportunities for information transfer.

I claim:

1. In a computer information storage system comprising
   an information storage disc having a number of information storage cylinders thereon,
   means for transferring information to and from said cylinders,
   means for moving said transfer means among said cylinders,
   the improvement comprising
   means attached to said information storage system for sensing the movement of said transfer means, and
   means responsive to said sensing means for recording said movement.

2. The system of claim 1 in which
   said transfer means is movably mounted on a mounting means, and said sensing means is sensitive to the vibration of said mounting means caused by the movement of said transfer means.

3. The system of claim 2 in which said sensing means is an accelerometer.

4. The system of claim 2 in which said recording means is a visual indicator.

5. The system of claim 4 in which said indicator is a graphic indicator.

6. The system of claim 4 in which said indicator is a light.

7. The system of claim 4 in which said indicator is a counter.

8. The system of claim 2 in which said recording means is a computer.

9. The system of claim 2 further comprising means providing
relative rotational movement between said cylinders and said transfer means,
said rotational movement means being mounted on said mounting means,
the improvement further comprising
means for sensing the vibration of said mounting means caused by said rotation, and
means responsive to said rotation sensing means for recording said rotation.

10. The system of claim 1 further comprising
means providing relative rotational movement between said cylinders and said transfer means,
the improvement further comprising
means attached to said information storage system for sensing said rotational movement, and
means responsive to said rotation sensing means for recording said rotation.

11. The system of claim 1 in which said sensing means is sensitive to the vibration caused by the movement of said transfer means.

12. The system of claim 1 in which said sensing means is an acoustic sensing means.

13. The system of claim 1 in which
the means for moving said transfer means comprises a coil and an armature, and
said sensing means senses the flow and direction of flow of current in said coil.

14. In a computer information storage system comprising
an information storage disc having a number of information storage cylinders thereon, and
means for rotating said cylinders,
the improvement comprising
means attached to said information storage system for sensing said rotational movement, and
means responsive to said rotation sensing means for recording said rotation.

15. The system of claim 14 in which said sensing means is sensitive to the vibration caused by said rotation.

16. The system of claim 15 in which
said rotating means is mounted on a mounting means, and
said sensing means is sensitive to the vibration of said mounting means caused by said rotation.

17. The system of claim 16 in which said sensing means is an accelerometer.

18. The system of claim 14 in which said recording means is a visual indicator.

19. The system of claim 18 in which said indicator is a graphic indicator.

20. The system of claim 18 in which said indicator is a light.

21. The system of claim 18 in which said indicator is a counter.

22. The system of claim 14 in which said recording means is a computer.

23. A method of determining the performance of a disc information storage device of a computer comprising
sensing the movement of the means for transferring information to and from the information storage, and
recording said movement.

24. The method of claim 23 in which
said movement causes a vibration, and
said vibration is sensed and recorded.

* * * * *